United States Patent Office
2,885,387
Patented May 5, 1959

2,885,387

AMIDE-LIKE POLYMERIZABLE CONDENSATION PRODUCTS DERIVED FROM AMINOTRIAZINE AND UREA COMPOUNDS AND PROCESS

Richard Sallmann and Arthur Maeder, Basel, Daniel Porret and Ernst Leumann, Monthey, and Otto Albrecht, Neue Welt, Switzerland, assignors to Ciba Limited, Basel, Switzerland, a Swiss firm No Drawing. Application August 21, 1953
Serial No. 375,831

Claims priority, application Switzerland August 29, 1952

11 Claims. (Cl. 260—86.1)

The invention is based on the observation that polymerizable and, if desired, hardenable amide-like products can be made by reacting a condensation product of formaldehyde and a compound of the amino-triazine or urea group, which condensation product contains at least one free methylol group or at least one methylol group etherified with an alcohol of low molecular weight, with an unsaturated nitrile in the presence of an acid condensing agent.

As formaldehyde condensation products of the aminotriazine group for use in the process of this invention there may be used in general all the products which contain at least one free methylol group or at least one methylol group etherified with an alcohol of low molecular weight. Among these products there may be mentioned above all reaction products of formaldehyde with 2:4:6-triamino-1:3:5-triazine, which latter compound is ordinarily known as melamine. Such condensation products may contain from 1 to 6 methylol groups, and they are usually a mixture of different compounds. There also come into consideration methylol compounds of melamine derivatives which contain at least one amino group, for example, methylol compounds of melam, melem, ammeline, ammelide or of halogen-substituted aminotriazines, such as 2-chloro-4:6-diamino-1:3:5-triazine; and also methylol compounds of guanamines such, for example, as those of benzoguanamine, acetoguanamine or formoguanamine.

The ethers with alcohols of low molecular weight, which ethers may also be used as starting materials, may be derived from the aforesaid compounds and methyl alcohol, ethyl alcohol, a propyl alcohol or a butyl alcohol. For example, there may be used methyl ethers of methylol-melamines containing 3 to 6 methylol groups, of which 2 to 6 methylol groups are etherified. The formaldehyde condensation products suitable for the present process may contain further substituents. They may contain ester, ether or acid amide groups. Among the ester-like compounds there come into consideration, for example, those which are obtainable by esterifying a methylolmelamine, or an ether thereof with an alcohol of low molecular weight, with an aliphatic carboxylic acid of high molecular weight, such as lauric acid, palmitic acid, stearic acid, behenic acid, oleic acid or fatty aids of the last runnings, or with an aromatic carboxylic acid, such as benzoic acid and substitution products thereof, or with cycloaliphatic acid, such as abietic acid or naphthenic acids. As compounds which contain further ether groups there come into consideration those obtainable by etherifying the aforesaid methylol compounds, or their ethers with alcohols of low molecular weight, with aliphatic alcohols of high molecular weight or araliphatic alcohols, such as octyl, dodecyl, 2-butyl-octyl, cetyl, oleyl, octadecyl or benzyl alcohol. Starting compounds containing amide groups may be derived from acid amides or N-methylol-acid amides of the acids mentioned above in connection with the esters.

Furthermore, there may be used in the present process condensation products of formaldehyde and guanyl-melamines. Such condensation products may be derived from mono-, di- or tri-guanyl-melamine or mixtures of these compounds, which are obtainable by treating dicyandiamine in an inert solvent at a raised temperature with a gaseous hydrogen halide, and isolating the free amines from the resulting salts by the addition of a strong alkali. There may also be used for preparing the formaldehyde condensation products substituted guanylmelamines.

The formaldehyde condensation products of the aminotriazine group may be used in a preponderatingly monomeric or partially condensed condition. The monomeric or partially condensed compounds are water-soluble, provided that they do not contain a large number of distinctly hydrophobic residues. A suitable starting material is, for example, a condensation product of unlimited solubility in water from 3 mols of formaldehyde and 1 mol of melamine or a derivative hexamethylolmelamine containing about 3 methyl ether groups. The partially condensed products are generally only of limited solubility or quite insoluble in water. A product of limited solubility in water, which can be used in the present process, is obtainable, for example, by heating a solution of 1 mol of melamine and about 3 mols of an aqueous formaldehyde solution at a pH value of 8–9 at about 80° C. until 1 part of a cooled test portion just produces turbidity when mixed with 3–4 parts of cold water.

As formaldehyde condensation products of the urea group there may be used in the present process all those which contain at least one free methylol group or at least one methylol group etherified with an alcohol of low molecular weight. As compounds of the urea group there may be mentioned, for example, urea, thiourea and compounds which contain the atomic grouping

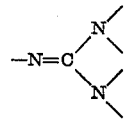

such as dicyandiamide, dicyandiamidine, guanidine, acetoguanidine or biguanide. A suitable starting material is, for example, dimethylol-urea.

The unsaturated nitriles used as second components in the present process may be derived from any aliphatic, cycloaliphatic, araliphatic or heterocyclic monobasic or polybasic carboxylic acids, which contain one or more double or triple bonds, and must be polymerisable or copolymerisable. There are advantageously used α:β-unsaturated carboxylic acid nitriles of the general formula

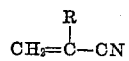

in which R represents hydrogen, chlorine or an alkyl residue. There may be mentioned, for example, furylacrylic acid nitrile, cinnamic acid nitrile, methacrylic acid nitrile, muconic acid dinitrile, crotonic acid nitrile, acetylene-dicarboxylic acid dinitrile, phenylpropiolic acid nitrile, α-chloroacrylic acid nitrile and especially acrylic acid nitrile. Acrylic acid nitrile is advantageous owing to the ease with which it can be obtained and its reactivity.

As acid condensing agents, in the presence of which the condensation of the present invention is carried out, there come into consideration advantageously strong inorganic acids such as phosphoric acid and especially sulfuric acid, which are used with advantage in anhydrous form. The condensing agent is advantageously added in excess. If desired, there may also be added to the reaction mixture an inert organic solvent, such as tetrahydrofurane or glacial acetic acid. The reaction temperature, which must be maintained for making the various amide-like compounds, cannot be predicted with certainty. It depends on the starting materials used. In a few cases it is of advantage to cool the reaction mixture with a mixture of ice and sodium chloride and to add the individual components in small portions. In other cases prolonged heating at a higher temperature, for example, 70–90° C., is necessary. The evolution of heat which takes place when all the components are brought together serves as an indication of the most favourable reaction conditions. After the condensation has finished, it is of advantage to pour the reaction mixture into water and neutralize the free acid. The amide-like condensation product so formed can then be separated by filtration or recovered by extraction with an organic solvent.

The selection of the relative proportions of the reaction components and the choice of the components themselves depend entirely on the properties that are desired in the final product. If homopolymerizable products are desired there are used nitriles which themselves possess this property. Such condensation products can generally be copolymerized with other unsaturated compounds. If, on the other hand, there are used nitriles that are only capable of copolymerization, condensation products are obtained which can be polymerized only in admixture with other polymerizable bodies. If it is desired to produce compounds which, in addition to their capacity for homo- or co-polymerization, are capable of undergoing condensation, that is to say, are capable of being hardened, it is necessary to use as starting materials those methylol compounds or derivatives thereof, which are themselves capable of being hardened, and the relative proportions of the reaction components must be so chosen that at least one free methylol group or at least one methylol group etherified with an alcohol of low molecular weight remains in the final product. Such hardenable products are also obtained with advantage by using as starting materials in the present process methylol-compounds into which further methylol groups can be introduced, or ethers derived from such methylol compounds and alcohols of low molecular weight, carrying out the reaction with the nitrile, and then introducing the further methylol groups by reaction with formaldehyde. The latter reaction with formaldehyde is carried out under the conditions usual for introducing methylol groups. Advantageously, the reaction product first obtained is heated with a concentrated aqueous solution of formaldehyde with the addition of a small quantity of an acid or a compound of alkaline reaction.

The newly introduced methylol groups may be left in the final product, or they may be reacted wholly or in part with an alcohol, an acid, an ester, an amide or an N-methylol-amide, whereby the properties of the products can be modified to a considerable extent.

Owing to the fact that the formaldehyde condensation products used in the present process are generally not unitary compounds, the amide-like bodies produced therewith are in many cases likewise not unitary compounds but are mixtures.

The polymerization of the amide-like products may be carried out in bulk, in solution or in emulsion, the conditions customarily used in polymerization technique being used. Thus, it is of advantage to use polymerization catalysts. The usual compounds that catalyze polymerizations may be added, such as organic or inorganic peroxides or per-salts, for example, peracetic acid, acetyl peroxide, benzoyl peroxide, benzoyl acetyl peroxide, lauryl peroxide, cumene hydroperoxide, tertiary butyl hydroperoxide, para-methane hydroperoxide, hydrogen peroxide, percarbonates, persulfates or perborates. The proportions in which they are added are adjusted in known manner depending on the course of reaction desired and on the properties desired in the polymers. If desired, a plurality of agents catalyzing the polymerization may be brought into action. The action of the polymerization catalysts may be enhanced by the simultaneous action of heat and/or actinic rays. It may indeed be possible to bring about the polymerization only by means of heat and/or actinic rays, that is to say, without the addition of catalytically active compounds. In order to control the speed of the polymerization reaction and the molecular weight of the polymers, so-called regulators such, for example, as mercaptans, terpenes, etc. may be added.

It is also of advantage to conduct the polymerization in the absence of air or oxygen and in the presence of an inert gas, such as nitrogen or carbon dioxide. So-called activators may also be used in addition to the above mentioned catalysts and regulators. Such activators are, for example, inorganic, oxidizable, oxygen-containing sulfur compounds such as sulfur dioxide, sodium bisulfite, sodium sulfite, ammonium bisulfite, sodium hydrosulfite and sodium thiosulfate. The presence of both activators and polymerization catalysts that liberate oxygen forms the so-called Redox system, which has a favorable influence on the polymerization process. As activators there may be used water-soluble aliphatic tertiary amines such as triethanolamine or diethyl-ethanolamine. The action of the polymerization catalysts can also be accelerated by the use of a heavy metal compound which is capable of existing in more than one stage of valency and is present in reduced condition, or by the addition of a complex cyanide of Fe, Co, Mo, Hg, Zn, Cu or Ag or a mixture of two or more such complexes. When the polymerization is carried out in emulsion, the monomeric compounds are advantageously emulsified with the aid of emulsifying agents. As emulsifying agents there come into consideration those of anion-active, cation-active or non-ionogenic character. Among the first-mentioned group there may be used, for example, acid sulfuric acid esters of fatty alcohols, sulfonated castor oil, higher alkyl sulfonates, higher oxyalkyl sulfonates, and especially sodium $\alpha$-oxyoctadecane sulfonate, preferably one which is free from other salts; sulfo-dicarboxylic acid esters, for example, the sodium salt of sulfo-succinic acid dioctyl ester; and also higher alkyl-aryl sulfonates. Among the group of cation-active emulsifying agents there may be used, for example, compounds of fatty amines of high molecular weight with acetic acid, hydrochloric acid or sulfuric acid, such as octadecylamine acetate or (dodecyl)-diethyl-cyclohexylamine sulfate; and also salts of diethylaminoethyl esters of higher fatty acids or salts of the type of oleylamidoethyl-diethylamine acetate, $C_{17}H_{33}CONHC_2H_4NH(C_2H_5)_2.OCOCH$. There are also suitable quaternary ammonium compounds, such as cetyl-dimethyl-benzyl-ammonium chloride, cetyl-trimethyl-ammonium bromide, para-(trimethylammonium)-benoic acid cetyl ester methosulfate, cetyl-pyridinium methosulfate, octadecyl-trimethyl-ammonium bromide or the quaternary compound of diethyl sulfate and triethanolamine tristearate.

Among the non-ionogenic emulsifying agents there may be mentioned polyglycol ethers of fatty acids, fatty amines or fatty alcohols of high molecular weight, such as cetyl alcohol, oleyl alcohol or octadecyl alcohol, for example, the reaction products of 15–30 mols of ethylene oxide and 1 mol of the fatty alcohol. There may also be used emulsifying agents having a pronounced wetting action, such as octyl-phenol polyglycol ethers and their acid sulfuric acid esters, and also lauryl alcohol polyglycol ethers or polyhydroc acohols partially esterified with higher fatty acids such, for example, as glycerine monolaurate or sorbitol monolaurate. There may also be used mixtures of emulsifying agents, and mixtures of emulsifying agents with protective colloids such as alginates, tragacanth, agar-agar, polyvinyl alcohols, partially esterified polyvinyl esters, proteins such as glue or gelatine, and also starch and starch derivatives, for example, dextrin, and furthermore cellulose ethers, polyethylene oxides, and also in general with water-soluble polymers or copolymers which contain free hydroxyl, amino, carboxylic acid or carboxylic acid amide groups. Finally, protective colloids may be used alone.

If the polymerization is carried out in solution, there may be used solvents in which only the monomeric compounds are soluble and the polymers are insoluble; but there may also be used solvents in which the polymers also are soluble.

The polymerization may be carried out at ordinary temperature, but it is more advantageous to conduct the polymerization at a raised temperature. There are suitable, for example, temperatures of 40–95° C., and especially 55–90° C. During the polymerizations considerable quantities of heat are often liberated, so that suitable cooling devices should be provided in order to maintain the desired polymerization temperatures. This is especially necessary when a large quantity is polymerized in one batch. In order to utilize the liberated heat and to enable the polymerization temperature to be controlled more easily, it has been found advantageous in emulsion polymerization, for example, to place in the polymerization apparatus only a small portion of a given quantity of an emulsion to be polymerized and to initiate the polymerization in that portion. When the temperature of that portion of the emulsion has reached a certain height, for example, 60–70° C., the remainder of the emulsion is run in cold in such manner that the temperature can be maintained constant. Towards the end of the polymerization it is often necessary to supply external heat.

Depending on the polymerization conditions and the starting materials used the polymeric compounds are obtained in the form of viscous solutions, granulates or emulsions. It is possible to use the products of the polymerization directly without further working up. It is often preferable to work them up in a suitable manner. There may be added, for example, modifying substances such as softening agents, e.g. dibutyl phthalate or dioctyl phthalate or sabacic acid ester, or organic or inorganic pigments or fillers. The monomeric compounds may also be polymerized in the presence of substrata. The polymerization may, for example, be carried out on a textile material. In this case the textile material is advantageously impregnated with a solution or emulsion of the monomer, and then the polymerization is brought about by heating the material with the addition of a polymerization catalyst. If polymerizable and hardenable amide-like compounds of the invention are used, the polymerization and the hardening may be carried out in two stages by first polymerizing the material and then hardening it. Both operations may also be carried out simultaneously. For the hardening suitable hardening catalysts are used. As such catalysts there may be used the usual hardening catalysts, for example, acids such as hydrochloric acid, sulfuric acid or formic acid; there may also be used salts of strong acids with weak bases, for example, ammonium salts of strong inorganic or organic acids, such as ammonium chloride, ammonium sulfate, ammonium nitrate, ammonium oxalate or ammonium lactate. When solutions in organic solvents are used there come into consideration catalysts which are soluble in the organic solvents, for example, strong organic acids, such as formic acid, acetic acid, chloracetic acid or compounds capable of splitting off acid under the action of heat, such as diethyl tartrate or triacetin.

As stated above, the products of the invention may, if desired, be polymerized with other unsaturated polymerizable compounds. As such compounds there come into consideration especially those containing the atomic grouping $CH_2=C<$, such as vinyl esters of organic acids, for example, vinyl acetate, vinyl formate, vinyl butyrate, vinyl benzoate, and also vinyl alkyl ketones, vinyl halides such as vinyl chloride, vinyl fluoride or vinylidene chloride, and vinyl-aryl compounds such as styrene and substituted styrenes, and furthermore compounds of the acrylic acid series such as esters of acrylic acid with alcohols or phenols, for example, ethyl acrylate, butyl acrylate, dodecyl acrylate, acrylonitrile or acrylic acid amide and its derivatives substituted at the amide nitrogen; and also analogous derivatives of methacrylic acid, α-chloracrylic acid, crotonic acid, maleic acid or fumaric acid, or finally acrylic acid or methacrylic acid itself. There may also be used polymerizable olefines such as isobutylene, butadiene, 2-chlorobutadiene or heterocyclic compounds containing at least one vinyl group. Binary or ternary copolymers or those of more complex structure can be made.

The products of the present process can be used either in monomeric form or in polymeric form for a very wide variety of purposes. They are generally applicable whenever condensation resins or polymerization resins are to be used. They may be used for the manufacture of masses to be moulded under pressure and moulded objects, film adhesives or lacquers. Suitable copolymers can be made having rubber-like properties and are useful as substitutes for rubber which are resistant to benzene and benzine. Provided that they have been made from suitable starting materials, the products are suitable, inter alia, as auxiliaries in the textile, leather and paper industries. They can be used for the production of impregnations or coatings, for example, textiles can be rendered water-repellent with appropriately substituted compounds. Additional applications of the new products are the dyeing, printing or dressing of natural or artificial fibres with pigments.

In general finishes produced with the products of the invention possess good durability in use, and the products that are polymerizable and hardenable possess especially valuable properties.

The following examples illustrate the invention, the parts being by weight unless otherwise stated, and the relationship of parts by weight to parts by volume being the same as that of the kilogram to the liter:

*Example 1*

21.6 parts of a trimethylol-melamine of limited solubility in water and 17 parts of acrylonitrile are introduced in equal portions into 150 parts by volume of sulfuric acid of 93 percent strength at 0–10° C. with rapid stirring. After the addition is complete and when no further increase in temperature occurs, so that the reaction is finished for the greater part, the ice cooling is removed and the mixture is further stirred for 2 hours at room temperature. The clear solution is then poured on to ice and the reaction mixture is neutralized by the addition of solid sodium carbonate and then rendered weakly alkaline. The aqueous solution is then extracted by agitation with butyl alcohol. The butyl alcohol layer is separated and dried with sodium sulfate. After distilling off the butanol in vacuo there are obtained 27 parts of a slightly yellow-colored solid substance, which dissolves clearly in a mixture of alcohol and water or in dilute hydrochloric acid. The aqueous solutions polymerize on the addition of suitable catalysts.

The trimethylol-melamine of limited solubility in water used in this example may be prepared as follows: A solution of 1 mol of melamine and about 3 mols of aqueous formaldehyde solution are heated at a pH value of 8–9 and at about 80° C. until 1 part of a cooled test portion when mixed with 3–4 parts of cold water just produces turbidity.

*Example 2*

38 parts of a condensation product of unlimited solubility in water from 1 mol of melamine and 2 mols of formaldehyde are introduced, while rapidly stirring, at 5° C. into 190 parts of sulfuric acid of 93 percent strength in the course of 20 minutes, the temperature being maintained below 10° C. by cooling. 22 parts of acrylonitrile are then introduced dropwise in the course of 15 minutes in such manner that the temperature does not rise above 20° C. When the addition is complete cooling is discontinued, and this causes the temperature of the reaction mixture to rise to 30° C. in the course of 10 minutes. The mixture is then heated for 45 minutes at 35° C. The mixture is then poured on to ice, the acid mass is then neutralized with a concentrated solution of caustic soda and the precipitated condensation product is filtered off, washed and dried in vacuo at 50° C. There is obtained a white powder which is soluble in hot water containing a small amount of formic acid.

A condensation product of unlimited solubility in water from 1 mol of melamine and 3 mols of formaldehyde can be reacted in a similar manner with 3 mols of acrylonitrile.

*Example 3*

By the procedure described in Example 2 a condensation product from 1 mol of trimethylol-melamine and 2 mols of acrylonitrile is prepared with the use of 250 parts of sulfuric acid of 93 percent strength, 44 parts of trimethylol-melamine and 22 parts of acrylonitrile.

*Example 4*

The procedure is the same as that described in Example 2 except that there are used 300 parts of sulfuric acid, 62 parts of hexamethylol-melamine, and 34 parts of acrylonitrile, that is to say, 1 mol of hexamethylol-melamine and 3 mols of acrylonitrile are used. The white powder so obtained is fairly soluble in water and can be extracted therefrom with butanol.

*Example 5*

A mixture of 34 parts of acrylonitrile and 70 parts of a methylalcoholic solution containing 75 percent of a partially condensed trimethylol-melamine trimethyl ether is added to 240 parts of sulfuric acid of 98 percent strength, while stirring well, in the course of 30 minutes. The temperature rises rapidly to 70° C. The mass is maintained at that temperature for 45 minutes, first by cooling and subsequently by heating. The reaction mixture is then poured on to ice, the mass having an acid reaction is neutralized with a concentrated solution of caustic soda, and the precipitated condensation product is filtered off. It is first obtained in a somewhat greasy form and is rendered solid by trituration with water. There is finally obtained a solid white powder.

The trimethylol-melamine trimethyl ether used in this example can be prepared by etherifying the trimethylol-melamine of limited solubility in water described in Example 1 with an excess of methanol with the addition of a small amount of acid, and after the etherification the acid is neutralized and the methyl alcoholic solution is evaporated to a dry content of 75 percent.

*Example 6*

The procedure is the same as that described in Example 5, except that a mixture of 70 parts of the solution of trimethylol-melamine trimethyl ether of 75 percent strength mentioned in Example 5 and 23 parts of acrylonitrile are used. These quantities correspond to 2 mols of acrylonitrile and 1 mol of the melamine ether. Instead of 23 parts of acrylonitrile only 11 parts thereof need be used. In the latter case only 1 mol of acrylonitrile is used for 1 mol of the melamine ether.

*Example 7*

While stirring strongly there is added to 280 parts of sulfuric acid of 98 percent strength a mixture of 34 parts of acrylonitrile and 135 parts of a resin solution, which consists of 80 percent of a partially condensed hexamethylol-melamine n-butyl ether containing about 4 butyl ether groups and 20 percent of butanol. During the addition the temperature rises to 60° C. and that temperature is maintained for 30 minutes. The mass is then poured on to ice and the condensation product is isolated in the manner described in the preceding examples. There is obtained a brownish colored powder.

The quantities of acrylonitrile and melamine ether used in this example correspond to three mols of acrylonitrile and one mol of the ether.

*Example 8*

The procedure is the same as that described in Example 5, except that 280 parts of sulfuric acid of 98 percent strength, 99 parts of a hexamethylol-melamine trimethyl ether and 84 parts of acrylonitrile are used, which corresponds to 3 mols of the nitrile and 1 mol of the melamine derivative. There is obtained a white amorphous powder.

*Example 9*

50 parts of sulfuric acid of 98 percent strength are slowly introduced dropwise, while stirring well, into a mixture of 30 parts of dimethylol-urea, 27 parts of acrylonitrile and 23 parts of ethanol contained in a flask fitted with a stirring means and a reflux condenser. Care is taken that the temperature does not exceed 70° C., which may be brought about, when necessary, by cooling with ice. After the whole of the sulfuric acid has been added and the temperature no longer increases spontaneously, the mixture is heated for a further 30–40 minutes at 70–80° C. At the end of this period practically all the solid matter has passed into solution, and the clear viscous solution, after being cooled, is poured into 150 parts of ice water. The sulfuric acid which is liberated is then neutralized with the calculated quantity of calcium carbonate, the mixture is then filtered to remove precipitated calcium sulfate, and the filter residue is washed with a quantity of water such that the filtrate contains 250 parts of liquid. There is obtained in this manner a solution of the condensation product of about 20 percent strength which is stable for a long time, and which polymerises even upon the addition of a small amount of potassium persulfate and by shaking the mixture at room temperature. If desired, the solution may be concentrated still further in vacuo at a temperature below 40° C.

If the reaction is carried out with methanol instead of ethanol by introducing the dimethylolurea in a finely powdered form into the solution, cooled below 0° C., of sulfuric acid, acrylonitrile and methanol, then bringing the temperature to 70° C. by slight heating and maintaining that temperature for 30 minutes, and further proceeding in the manner described in this example, there is obtained a solution which is equally easy to polymerize.

*Example 10*

380 parts of dimethylol-melamine are introduced, while stirring, into 1920 parts of sulfuric acid of 93 percent strength in the course of 40 minutes at a temperature below 10° C. 220 parts of acrylonitrile are then introduced dropwise in the course of 30 minutes, the temperature being maintained below 20° C. by cooling. After allowing the reaction mass to stand for 3 hours at room temperature it is poured on to ice and the acid is neutralized with concentrated caustic soda solution. The reaction product is filtered off and washed with water. It is then suspended in 600 parts of an aqueous solution of formaldehyde of 40 percent strength, which has been given a pH value of 8.5–9 by the addition of a small quantity of caustic soda solution. The reaction mixture is then heated to 60° C., and after 10 minutes dissolution is complete. The solution is freed from impurities by filtration and then evaporated in a spray drier to dryness. There is obtained a powder which is completely soluble in water and is polymerizable.

In this example the quantities of the reaction components are chosen so that there is used 1 mol of dimethylol-melamine, 2 mols of acrylonitrile and 3 mols of formaldehyde.

*Example 11*

The procedure is the same as that described in Example 10, except that for 1 mol of dimethylolmelamine and 2 mols of acrylonitrile only 2 mols or 4 mols of formaldehyde are used. Similar products are obtained by first reacting 1 mol of trimethylol-melamine with 3 mols of acrylonitrile and then reacting the product with 1–3 mols of formaldehyde.

*Example 12*

380 parts of dimethylol-melamine are condensed in the manner described in Example 10, with 110 parts of acrylonitrile by introducing it into 1650 parts of sulfuric acid of 93 percent strength. After pouring the reaction mixture on to ice and neutralizing the acid with concentrated caustic soda solution, the water-soluble condensation product is extracted by agitation with n-butanol. The butanol is then removed in vacuo, the residue is dissolved in 1000 parts of water and the solution is mixed with 500 parts of formaldehyde solution of 38 percent strength. The pH value of the solution is adjusted to 8.5–9 by the addition of a small amount of caustic soda solution, and the mixture is heated for 15 minutes at 60° C. The condensation product is then obtained in the form of a white water-soluble powder by drying it in a spray drier.

In this example the quantities of the reaction components are so chosen that 1 mol of dimethylol-melamine, 1 mol of acrylonitrile and 4 mols of formaldehyde are used.

*Example 13*

A suspension of 6 parts of the condensation product described in Example 4 and 54 parts of isobutyl acrylate is emulsified by means of an emulsifying device in 150 parts of water, which contains 9 parts of a non-ionogenic emulsifier, 0.2 part of triethanolamine, 0.1 part of isooctanol and 1 part of heptadecanol.

One half of the above emulsion is heated at 65° C. in a polymerization vessel provided with a reflux condenser, while stirring, and in an atmosphere of nitrogen, and then mixed with 0.5 part of potassium persulfate solution of 10 percent strength. When the polymerization has commenced, the other half of the emulsion is introduced in the course of 30–40 minutes, 1.5 part of potassium persulfate solution of 10 percent strength having been previously added to the emulsion. Owing to the evolution of heat of reaction the temperature slowly rises to 75° C. or higher. When the addition of the emulsion of the monomer is complete, the whole is heated for a further 2–2½ hours at 75–80° C. Finally a strong current of nitrogen is blown for 5 minutes into the free space in the polymerization vessel, in order to remove traces of monomers, and the mixture is then cooled to 30° C. The fine grained precipitated colorless copolymer is filtered off with suction, washed several times, and then dried at 120–130° C. in a drying cabinet in vacuo. It is an elastic rubber-like mass which is completely insoluble in solvents such, for example, as benzene.

Very tough rubber-like masses are obtained by using in this example, instead of 6 parts of the product described in Example 4, the same quantity of the product described in the first paragraph of Example 2 or in Example 3, and carrying out the copolymerization in an analogous manner.

*Example 14*

A light fabric is foularded with a solution of 50 parts of the reaction product described in Example 1 in 50 parts of alcohol and 50 parts of water with the addition of 0.5 part of ammonium persulfate, the fabric being foularded twice without intermediate drying and with squeezing to an increase in weight of 100 percent. The fabric so treated is then dried at 80° C. and heated for 10 minutes at 120° C., whereby polymerization and condensation of the substance applied to the fibre take place. There is obtained a well filled dressing having a pleasant feel, which is fast to washing and boiling.

What is claimed is:

1. A polymerizable amide-like condensation product which has been obtained by condensing in the presence of concentrated sulfuric acid as the reaction medium and in the absence of a polymerization catalyst a compound selected from the group consisting of condensation products of melamine and formaldehyde having from 1 to 6 methylol groups and ethers of said condensation products with saturated aliphatic low-molecular weight alcohols having at most 4 carbon atoms, with a nitrile of an unsaturated at least copolymerizable carboxylic acid.

2. A polymerizable amide-like condensation product which has been obtained by condensing in the presence of concentrated sulfuric acid as the reaction medium and in the absence of a polymerization catalyst a condensation product of melamine and formaldehyde having from 1 to 6 methylol groups with a nitrile of the general formula

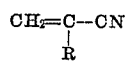

in which R represents a member of the group of hydrogen, chlorine and lower alkyl.

3. A polymerizable amide-like condensation product which has been obtained by condensing in the presence of concentrated sulfuric acid as the reaction medium and in the absence of a polymerization catalyst 1 mol of a condensation product of melamine and formaldehyde of unlimited solubility in water and containing about 3 methylol groups with 3 mols of acrylonitrile.

4. A polymerizable amide-like condensation product which has been obtained by condensing in the presence of concentrated sulfuric acid as the reaction medium and in the absence of a polymerization catalyst 1 mol of hexamethylolmelamine with 3 mols of acrylonitrile.

5. A polymerizable amid-like condensation product which has been obtained by condensing in the presence of concentrated sulfuric acid as the reaction medium and in the absence of a polymerization catalyst first a condensation product of melamine and formaldehyde into which further methylol groups can be introduced, with acrylonitrile and then the condensation product thus obtained with formaldehyde.

6. A polymerizable amide-like condensation product which has been obtained by condensing in the presence of concentrated sulfuric acid as the reaction medium and in the absence of a polymerization catalyst first 1 mol of dimethylolmelamine with 2 mols of acrylonitrile and then the condensation product thus obtained with 3 mols of formaldehyde.

7. A polymerization product which has been obtained by copolymerizing (a) a polymerizable amide-like condensation product which has been obtained by condensing in the presence of concentrated sulfuric acid as the reaction medium and in the absence of a polymerization catalyst a compound selected from the group consisting of condensation products of melamine and formaldehyde having from 1 to 6 methylol groups and ethers of said condensation products with saturated aliphatic low-molecular weight alcohols having at most 4 carbon atoms, with a nitrile of an unsaturated at least copolymerizable carboxylic acid, with (b) a monomeric polymerizable ethylenically unsaturated compound.

8. A polymerization product which has been obtained by copolymerizing (a) a polymerizable amide-like condensation product which has been obtained by condensing in the presence of concentrated sulfuric acid as the reaction medium and in the absence of a polymerization catalyst a compound selected from the group consisting of condensation products of melamine and formaldehyde having from 1 to 6 methylol groups and ethers of said condensation products with saturated aliphatic low-molecular weight alcohols having at most 4 carbon atoms, with a nitrile of an unsaturated at least copolymerizable carboxylic acid, with (b) a monomeric polymerizable compound containing the atomic group $CH_2=C<$.

9. A polymerization product which has been obtained by copolymerizing (a) concentrated sulfuric acid as the reaction medium and in the absence of a polymerization catalyst 1 mol of hexa- a polymerizable amide-like condensation product which has been obtained by condensing in the presence of methylolmelamine with 3 mols of acrylonitrile, with (b) isobutyl acrylate.

10. A polymerization process which comprises polymerizing on a substratum a polymerizable amide-like condensation product which has been obtained by condensing in the presence of concentrated sulfuric acid as the reaction medium and in the absence of a polymerization catalyst a compound selected from the group consisting of condensation products of melamine and formaldehyde having from 1 to 6 methylol groups and ethers of said condensation products with saturated aliphatic low-molecular weight alcohols having at most 4 carbon atoms, with a nitrile of an unsaturated at least copolymerizable carboxylic acid.

11. A polymerization process which comprises polymerizing on a textile material a polymerizable amide-like condensation product which has been obtained by condensing in the presence of concentrated sulfuric acid as the reaction medium and in the absence of a polymerization catalyst 1 mol of a condensation product of melamine and formaldehyde of limited solubility in water and containing about 3 methylol groups with 3 mols of acrylonitrile.

References Cited in the file of this patent

UNITED STATES PATENTS

| | | |
|---|---|---|
| 2,279,497 | Sallmann et al. | Apr. 14, 1942 |
| 2,337,547 | D'Alelio | Dec. 28, 1943 |
| 2,340,045 | D'Alelio | Jan. 25, 1944 |
| 2,476,065 | Robinson | July 12, 1949 |
| 2,512,671 | Novotny et al. | June 27, 1950 |
| 2,543,094 | Brighton et al. | Feb. 27, 1951 |
| 2,679,494 | Thomas | May 25, 1954 |

OTHER REFERENCES

Buc: "The Reaction of N-Hydroxymethyl Phthalimide With Nitriles," Jour. Amer. Chem. Soc., volume 69, February 1947, pages 254–255.

Magat et al.; "Acid-Catalyzed Reaction of Nitriles," Jour. Amer. Chem. Soc., volume 73, March 1951, pages 1035–1037.

UNITED STATES PATENT OFFICE

CERTIFICATE OF CORRECTION

Patent No. 2,885,387                                              May 5, 1959

Richard Sallmann et al

It is hereby certified that error appears in the printed specification of the above numbered patent requiring correction and that the said Letters Patent should read as corrected below.

Column 1, line 61, for "aids" read -- acids --; column 2, line 22, after "derivative" insert -- of --; column 4, line 58, for "benoic" read -- benzoic --; column 5, line 43, for "sabacic" read -- sebacic --; column 11, lines 7 to 13, claim 9 should appear as shown below instead of as in the patent:

> A polymerization product which has been obtained by copolymerizing (a) a polymerizable amide-like condensation product which has been obtained by condensing in the presence of concentrated sulfuric acid as the reaction medium and in the absence of a polymerization catalyst 1 mol of hexamethylolmelamine with 3 mols of acrylonitrile, with (b) isobutyl acrylate.

Signed and sealed this 12th day of July 1960.

(SEAL)
Attest:

KARL H. AXLINE                                           ROBERT C. WATSON
Attesting Officer                                       Commissioner of Patents